United States Patent [19]
Pardue

[11] Patent Number: 5,419,304
[45] Date of Patent: May 30, 1995

[54] MOUNTING JIGS FOR TURKEY CALLS

[76] Inventor: Roger K. Pardue, Rte. 2 Box 615, North Tazewell, Va. 24630

[21] Appl. No.: 164,532
[22] Filed: Dec. 10, 1993
[51] Int. Cl.$^6$ ............................................. F41B 5/00
[52] U.S. Cl. ...................................... 124/86; 446/397
[58] Field of Search ............ 248/225.31, 231.9, 309.1, 248/205.1; 124/86, 88, 23.1; 446/397; 224/191

[56] References Cited

U.S. PATENT DOCUMENTS

| | | | |
|---|---|---|---|
| 4,336,786 | 6/1982 | Mannon et al. | 124/86 X |
| 4,788,961 | 12/1988 | Toth | 124/88 X |
| 5,244,430 | 9/1993 | Legursky | 224/222 X |

Primary Examiner—Ramon O. Ramirez

[57] ABSTRACT

Mounting jigs removably couplable to a hunting bow and adapted to removably receive a turkey caller comprising a support plate having a primary rectangular component with an upper horizontal surface adapted to receive thereon a turkey caller, the support plate having a supplemental rectangular component with an aperture, therethrough the support plate having an intermediate component between the primary component and the supplemental component, the intermediate component having an angled face positioned to face toward a bow when the plate is coupled thereto; a pair of outboard dowels extending from the outboard face of the primary plate, the dowels extending parallel to each other and a pair of inboard dowels, one of the inboard dowels being parallel with the outboard dowels and another of the inboard dowels projecting inwardly from the angled surface, the dowels together forming projections to preclude lateral movement of elastic bands holding a turkey caller on the upper surface; and an attachment member in the supplemental component for removably coupling the support plate to a bow.

6 Claims, 4 Drawing Sheets

MOUNTING JIGS FOR TURKEY CALLS

BACKGROUND OF THE INVENTION

1. Field of the Invention

The present invention relates to mounting jigs for turkey calls and more particularly pertains to holding down turkey callers onto a hunting bow through a jig.

2. Description of the Prior Art

The use of archery accessories is known in the prior art. More specifically, archery accessories heretofore devised and utilized for the purpose of holding archery accessories adjacent to a bow are known to consist basically of familiar, expected, and obvious structural configurations, notwithstanding the myriad of designs encompassed by the crowded prior art which has been developed for the fulfillment of countless objectives and requirements.

The prior art shows a large variety of devices coupled to a compound bow. By way of example, note U.S. Pat. No. 4,124,014 to Darlington which discloses a grip mount for a compound bow.

U.S. Pat. No. 4,195,616 to Darlington discloses an archery bow quiver mount.

U.S. Pat. No. 4,237,615 to Bracknell discloses a sight mount for an archery bow.

U.S. Pat. No. 4,291,469 to Weast discloses an archery bow mount for a telescopic sight.

Lastly, U.S. Pat. No. 5,123,396 to Shepley discloses an accessory mount for a compound bow.

In this respect, the mounting jigs for turkey calls according to the present invention substantially departs from the conventional concepts and designs of the prior art, and in doing so provides an apparatus primarily developed for the purpose of holding down turkey callers onto a hunting bow through a jig.

Therefore, it can be appreciated that there exists a continuing need for new and improved mounting jigs for turkey calls which can be used for holding down turkey callers onto a hunting bow. In this regard, the present invention substantially fulfills this need.

SUMMARY OF THE INVENTION

In view of the foregoing disadvantages inherent in the known types of archery accessories now present in the prior art, the present invention provides an improved mounting jigs for turkey calls. As such, the general purpose of the present invention, which will be described subsequently in greater detail, is to provide a new and improved mounting jigs for turkey calls and method which has all the advantages of the prior art and none of the disadvantages.

To attain this, the present invention essentially comprises a mounting jig removably couplable to a hunting bow and adapted to removably receive a turkey caller comprising, in combination, a support mounting jigs removably couplable to a hunting bow and adapted to removably receive a turkey caller comprising a support plate having a primary rectangular component with an upper horizontal surface adapted to receive thereon a turkey caller, the support plate having a supplemental rectangular component with an aperture, therethrough the support plate having an intermediate component between the primary component and the supplemental component, the intermediate component having an angled face positioned to face toward a bow when the plate is coupled thereto; a pair of outboard dowels extending from the outboard face of the primary plate, the dowels extending parallel to each other and a pair of inboard dowels, one of the inboard dowels being parallel with the outboard dowels and another of the inboard dowels projecting inwardly from the angled surface, the dowels together forming projections to preclude lateral movement of elastic bands holding a turkey caller on the upper surface; and an attachment member in the supplemental component for removably coupling the support plate to a bow.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved mounting jibs for turkey calls which have all the advantages of the prior art archery accessories and none of the disadvantages.

It is another object of the present invention to provide new and improved mounting jigs for turkey calls which may be easily and efficiently manufactured and marketed.

It is further object of the present invention to provide new and improved mounting jigs for turkey calls which are of durable and reliable constructions.

An even further object of the present invention is to provide new and improved mounting jigs for turkey calls which are susceptible of a low cost of manufacture with regard to both materials and labor, and which accordingly are then susceptible of low prices of sale to the consuming public, thereby making such mounting jibs for turkey calls economically available to the buying public.

Still yet another object of the present invention is to provide new and improved mounting jigs for turkey calls which provide in the apparatuses and methods of the prior art some of the advantages thereof, while simultaneously overcoming some of the disadvantages normally associated therewith.

Lastly, it is an object of the present invention to provide a mounting jig removably couplable to a hunting bow and adapted to removably receive a turkey caller comprising, in a support plate having a primary rectangular component with an upper horizontal surface adapted to receive thereon a turkey caller, the support plate having a supplemental rectangular component with an aperture, therethrough the support plate having an intermediate component between the primary component and the supplemental component, the intermediate component having an angled face positioned to face toward a bow when the plate is coupled thereto; a pair of outboard dowels extending from the outboard face of the primary plate, the dowels extending parallel to each other and a pair of inboard dowels, one of the inboard dowels being parallel with the outboard dowels and another of the inboard dowels projecting inwardly from the angled surface, the dowels together forming projections to preclude lateral movement of elastic bands holding a turkey caller on the upper surface; and an attachment member in the supplemental component for removably coupling the support plate to a bow.

These together with other objects of the invention, along with the various features of novelty which characterize the invention, are pointed out with particularity in the claims annexed to an forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the primary embodiment of the mounting jigs for turkey calls constructed in accordance with the principles of the present invention and.

The same reference numerals refer to the same parts through the various Figures.

DESCRIPTION OF THE PREFERRED EMBODIMENT

Figure 1:
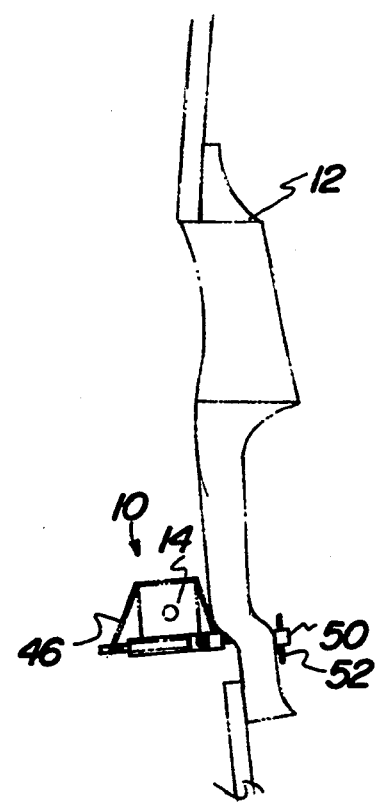

With reference now to the drawings, and in particular to FIG. 1 thereof, the preferred embodiment of the new and improved mounting jigs for turkey calls embodying the principles and concepts of the present invention and generally designated by the reference numeral 10 will be described.

Figure 2:
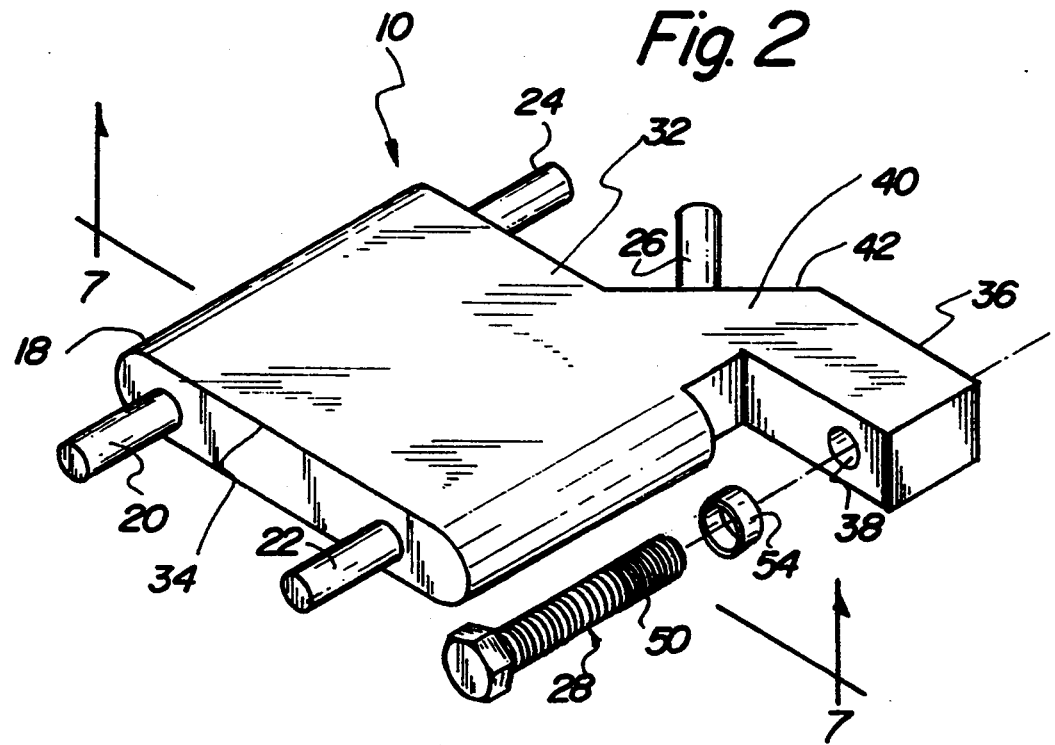
FIG. 2 is an enlarged perspective view of the device as shown in FIG. 1.

With particular reference to FIGS. 1 and 2, there is illustrated a mounting jig 10 removably couplable to a hunting bow 12 adapted to removably receive a turkey caller 14. The jig, in its broadest terms, comprises a support plate 18, dowels 20, 22, 24, 26 and a coupling member 28.

More specifically, the support plate 18 has a primary rectangular component 32 with an upper horizontal surface 34 adapted to receive thereon a turkey caller 14. The support plate 18 has a supplemental rectangular component 36 with an aperture 38 extending therethrough. The support plate 18 also has an intermediate component 40. The intermediate component extends between and couples the primary component 32 and the supplemental component 36. The intermediate component 40 has an angled side face 42 positioned to face toward a bow 12 when the plate is coupled thereto.

The second major feature of the FIG. 2 are the plurality of dowels 20, 22, 24 and 26. Such dowels include two dowels 20 and 22 which extend from the outboard face of the primary plate. Such outboard dowels extending parallel to each other. The dowels also include a pair of inboard dowels 24 and 26. One of the inboard dowels 24 is located parallel with the outboard dowels. Another of the inboard dowels 26 projects inwardly form the angled surface 42. The dowels together form projections to preclude lateral movement of elastic bands 46 in loop form which function for holding a turkey caller 14 onto the upper surface of the primary component 32.

The third major feature of the device of the present invention is an attachment mechanism. Such attachment mechanism is preferably in the form of a bolt 50. Such bolt is positioned through the hole 38 located through the supplemental component associated with the bolt is a nut 52 located on the opposite side of the bow 12 and a spacer 54 located between the head of the bolt and the support plate.

Figure 3:
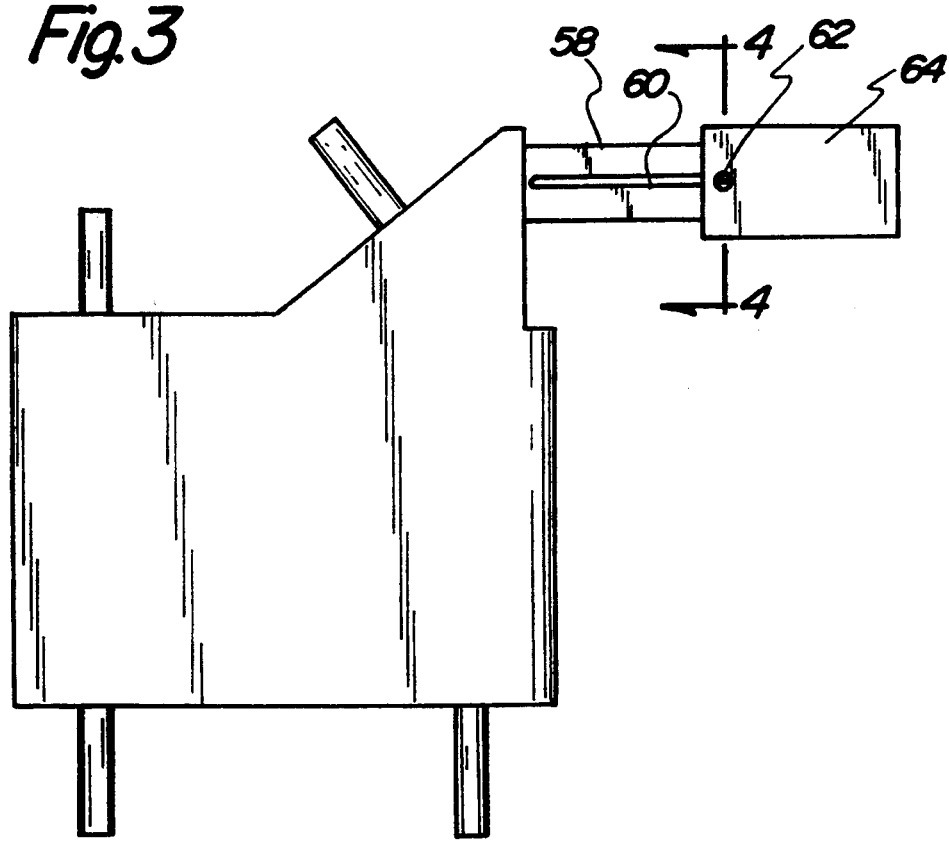
FIG. 3 illustrates an alternate embodiment of the mounting jibs for turkey calls.
Figure 4:
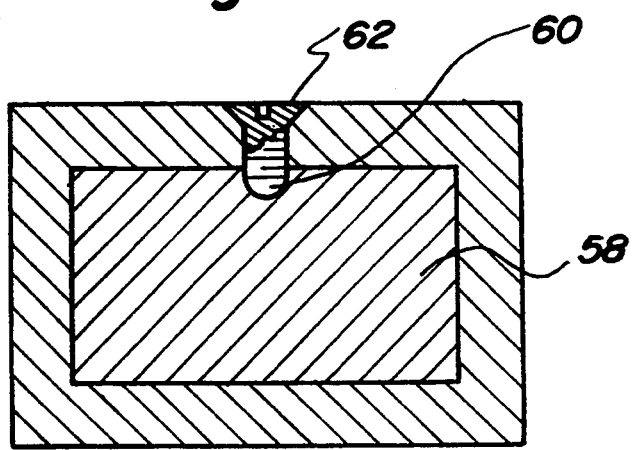
FIG. 4 is a sectional view of the device shown in FIG. 3 taken along line 4—4 of FIG. 3.
Figure 5:
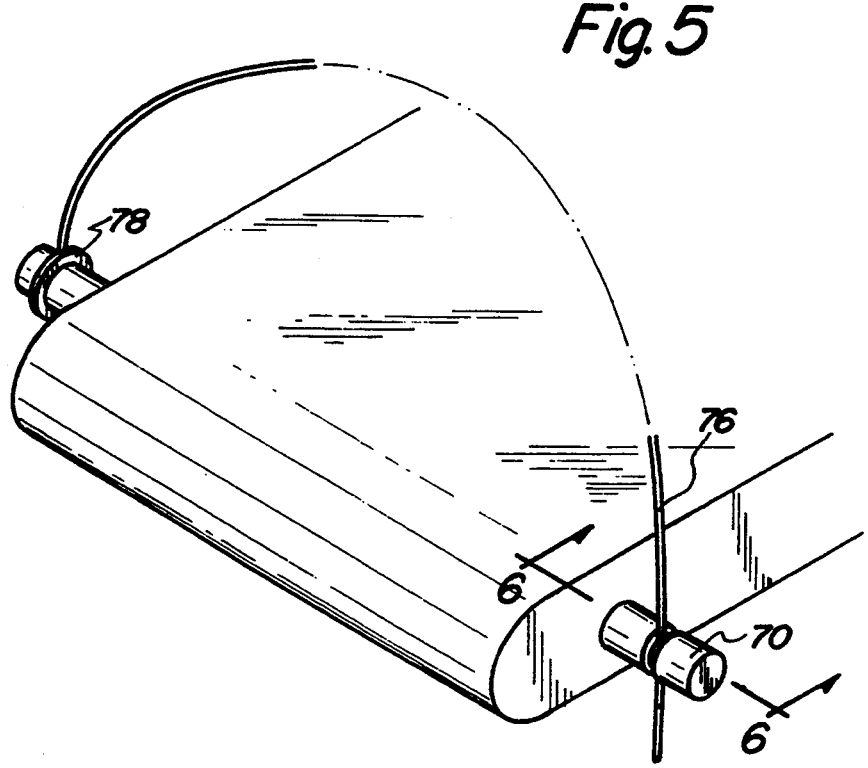
FIG. 5 is a perspective view of a portion of another alternate embodiment of the present invention.

FIGS. 3 and 4 illustrate an alternate embodiment of the invention which includes an adjustment assembly under the control of an operator to adjustably position the primary component 32 at a predetermined position laterally offset from the supplemental component. The adjustment assembly includes a support plate 58 extending laterally from the primary component 32. Such support plate 58 is formed with a groove 60. An adjusting set screw 62 extends through the upper surface of the supplemental component 64. Loosening the screw 62 thus allows repositioning the primary component 32 with respect to the supplemental component 64 and the bow 12 for user convenience. Tightening the screw 62 locks together the components.

Figure 6:
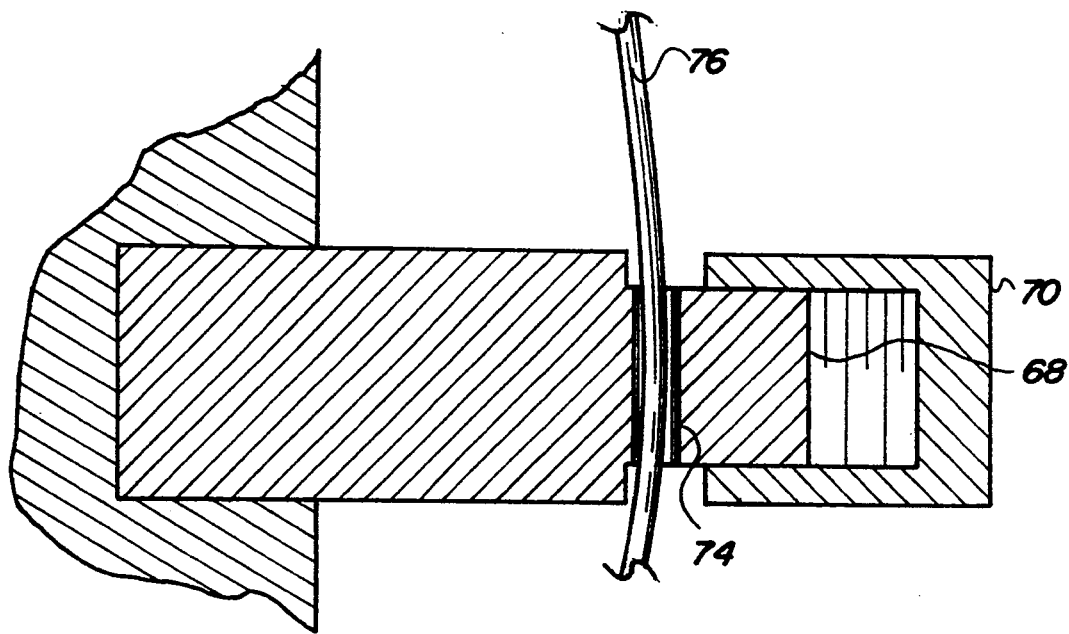
FIG. 6 is a sectional view of the device of FIG. 5 taken along line 6—6 of FIG. 5.
Figure 7:
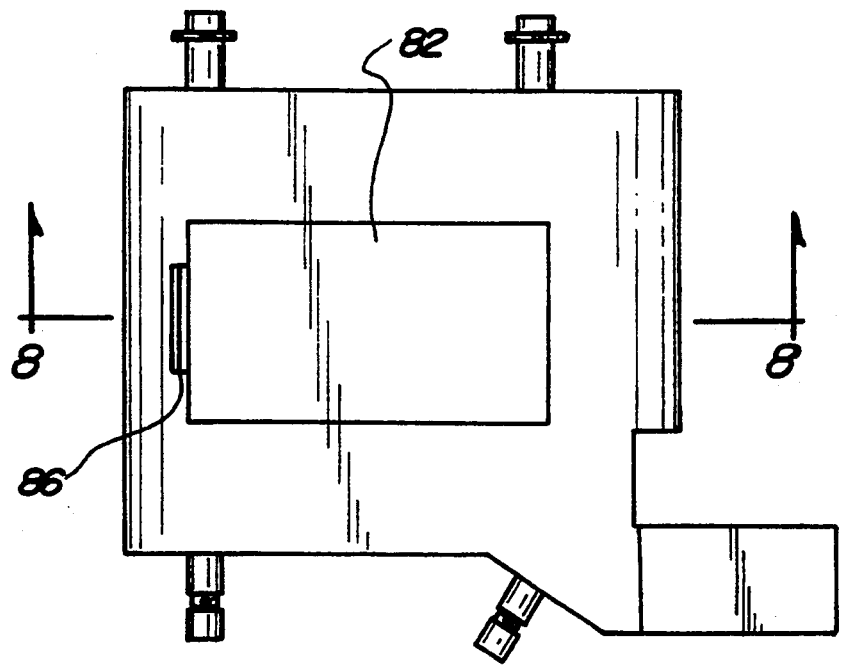
FIG. 7 is a plan view of yet another alternate embodiment of the invention.

In the alternate embodiment of the invention as shown in FIGS. 6 and 7, external threads 68 are formed on the outboard ends of the dowels. In association therewith, an exterior cap 70 is provided with internal threads 70. The caps 70 are thus threadingly removably attached to the dowels. An aperture 74 extends through each dowel whereby an elastic strap 76 may be positioned through each aperture. One end of each strap has a loop 78 positioned on a dowel adjustable positioning is through the tightening of the cap to secure a strap 76 for holding down a turkey caller 14 of any size.

Figure 8:
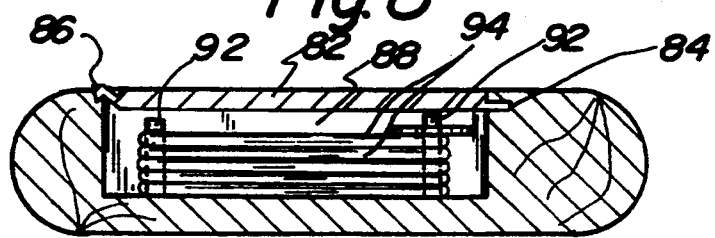
FIG. 8 is a sectional view of the device of FIG. 7 taken along line 8—8 of FIG. 7.

The final embodiment of the invention, that of FIGS. 7 and 8 includes a door 82. Such door formed in the upper surface of the primary component. The door includes a hinge 84 and a latch 86. Further included is a chamber 88 beneath the door. The chamber has vertically extending dowels 92 extending upwardly for the receipt of supplemental elastic bands 94.

The present invention is designed to facilitate the mounting of a push-button type turkey call on a hunting bow. This miniaturized jig has four small extension pegs and includes a 5/16 inch threaded bolt which is one and one-half inches long. It can be mounted to the face of any hunting bow using a small foam rubber insert and two elastic bands. In place, this jig will accommodate any of the variety of push button turkey calls offered on the market.

The present invention has two distinct advantages. First, both of the hunter's hands are free for other activity and, of course, to manipulate the bow itself without delay. Hence, the fleeting opportunity of a shot at otherwise elusive potential prey will not be missed. Secondly, the motion required to actuate the present invention is greatly minimized, since it is always within easy reach and potential game will not be startled into flight.

The present invention may be made of molded plastic or, like its prototype, from attractively grained walnut wood. This latter version will be more expensive but will compensate for this with greater market appeal. The functional efficiency of both will be identical. The present invention is simply fabricated, lends itself readily to high volume production and can be inexpensively manufactured.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A mounting jig removably couplable to a hunting bow and adapted to removably receive a turkey caller comprising, in combination:

a support plate having a primary rectangular component with an upper horizontal surface adapted to receive thereon a turkey caller, the support plate having a supplemental rectangular component with an aperture, therethrough the support plate having an intermediate component between the primary component and the secondary component, the intermediate component having an angled face positioned to face toward a bow when the plate is coupled thereto;

a pair of outboard dowels extending from the outboard face of the primary plate, the dowels extending parallel to each other and a pair of inboard dowels, one of the inboard dowels being parallel with one of the outboard dowels and another of the inboard dowels projecting inwardly from the angled surface, the dowels together forming projections to preclude lateral movement of elastic bands holding a turkey caller on the upper surface;

a bolt positioned through a hole in the supplemental component with a spacer located between the head of the bolt and the supplemental component;

an adjustment assembly under the control of an operator to adjustably position the primary component at a predetermined position laterally offset from the supplemental component, the adjustment assembly including a support plate with a groove and an adjusting set screw extending through the upper surface of the supplemental component;

external threads on the outboard ends of the dowels and an exterior cap with internal threads removably attached to the dowels with an aperture extending through each dowel there adjacent with an elastic strap through the apertures for holding down a turkey caller of any size;

a door formed in the upper surface of the primary component with a latch and further including a chamber beneath the door, the chamber having vertically extending dowels for the receipt of supplemental elastic bands.

2. A mounting jig removably couplable to a hunting bow and adapted to removably receive a turkey caller comprising:

a support plate having a primary rectangular component with an upper horizontal surface adapted to receive thereon a turkey caller, the support plate having a supplemental rectangular component with an aperture, therethrough the support plate having an intermediate component between the primary component and the supplemental component, the intermediate component having an angled face positioned to face toward a bow when the plate is coupled thereto;

a pair of outboard dowels extending from the outboard face of the primary plate, the dowels extending parallel to each other and a pair of inboard dowels, one of the inboard dowels being parallel with one of the outboard dowels and another of the inboard dowels projecting inwardly from the angled surface, the dowels together forming projections to preclude lateral movement of elastic bands holding a turkey caller on the upper surface; and an attachment member in the supplemental component for removably coupling the support plate to a bow.

3. The device as set forth in claim 2 and further including:

an adjustment assembly under the control of an operator to adjustably position the primary component at a predetermined position laterally offset from the primary component, the adjustment assembly including a support plate with a groove and an adjusting set screw extending through the upper surface of the supplemental component.

4. The device as set forth in claim 2 and further including:
a plurality of elastic bands in loop form positionable over the primary component between the dowels for holding down a turkey caller.

5. The device as set forth in claim 2 and further including:
external threads on the outboard ends of the dowels and an exterior cap with internal threads removably attached to the dowels with an aperture extending through each dowel there adjacent with an elastic strap through the apertures for holding down a turkey caller of any size.

6. The device as set forth in claim 2 and further including:
a door formed in the upper surface of the primary component with a latch and further including a chamber beneath the door, the chamber having vertically extending dowels for the receipt of supplemental elastic bands.

* * * * *